United States Patent [19]

Harris

[11] 4,083,821

[45] Apr. 11, 1978

[54] DECORATIVE NON-VINYL SURFACE COVERING COMPOSITION

[75] Inventor: Thomas G. Harris, Lancaster, Pa.

[73] Assignee: Armstrong Cork Company, Lancaster, Pa.

[21] Appl. No.: 789,297

[22] Filed: Apr. 20, 1977

[51] Int. Cl.² ............................ C08K 3/00; C08K 3/26
[52] U.S. Cl. ........................ 260/18 PF; 260/17.4 R; 260/30.6 R; 260/31.6; 260/31.8 M; 260/42.46; 260/897 C; 260/998.15; 260/DIG. 31
[58] Field of Search ........ 260/42.46, 897 C, DIG. 31, 260/998.15, 17.4 R, 31.6, 31.8 M, 30.6 R, 18 PF

[56] References Cited

U.S. PATENT DOCUMENTS 3,536,788  10/1970  Hurwitz et al. ................. 260/897 C
3,814,740  6/1974   Miller et al. ..................... 260/897 C Primary Examiner—James H. Derrington

[57] ABSTRACT

A decorative non-vinyl flooring composition is described which comprises a mineral filler distributed substantially uniformly throughout a binder comprising a blend of a copoly($C_1$ to $C_8$ alkyl acrylate/$C_6$ to $C_{12}$ cycloalkyl acrylate) and a chlorinated polyethylene.

9 Claims, No Drawings

DECORATIVE NON-VINYL SURFACE COVERING COMPOSITION

BACKGROUND OF THE INVENTION

1. Field of the Invention

This invention relates to a non-vinyl composition useful as a surface covering material. More particularly, it relates to a floor tile composition comprising a mineral filler and a binder that is a blend of a copoly(alkyl acrylate) and chloropolyethylene.

2. Description of the Prior Art

A widely used resinous binder material having particular unility in surface coverings is based on those polymers of vinyl chloride, such as the thermoplastic poly(vinyl chloride). When properly compounded with an assortment of plasticizers, heat and light stabilizers, fillers and pigments, the resultant vinyl composition displays satisfactory physical, traffic abrasion and stain resistance properties, such finding particular use as flooring materials. The economics of formulations employing these vinyl polymers particularly favors high filler loadings. However, the cavalier addition of filler materials to the vinyl resin binder is disadvantageous to those commercially important physical properties mentioned above. For example, one of the least expensive filler materials commonly used in vinyl compositions is calcium carbonate. Its sole use in vinyl formulations is generally detrimental to the compounding operation, requiring careful handling at slow speeds on sheet or calender rolls. Fluidity of the resultant molten mass is generally so high that the melt strength is negligible and proper calendering is all but impossible. Lack of dimensional stability, as exhibited by sheet shrinkage upon removal from the calender (nerve), is a further problem in these formulations. Of course, many difficulties with the calcium carbonate-only filled compositions can readily be resolved by the use of fibrous fillers, especially asbestos. Compositions containing such filler material display good melt strength, exhibiting the proper degree of viscous flow and melt elasticity, so that they can be readily sheeted, calendered and/or transported without excessive tearing or elongation in the manufacturing process. However, the use of asbestos has recently found a great deal of disfavor since various medical researchers and government officials have suggested that exposure to asbestos fiber-containing products may pose a serious health peril to the general public. At the present time, many states and municipalities are contemplating or have preliminarily passed legislation to end the use of asbestos in the confines of their jurisdiction. The manufacturing of compositions have reduced levels or completely free of asbestos has, therefore, become a prime goal in the flooring industry.

Additionally, vinyl chloride resins themselves have become subject to health hazard study. The monomer, vinyl chloride, is a noted carcinogen. This, in concert with the recent scarcity of the monomer-forming starting materials, suggests the importance of discovering non-vinyl, e.g. non-vinyl chloride-containing, resin binders.

In this respect, various surface covering materials have been compounded using such non-vinyl chloride-containing resin binders, one of the most successful being the chlorinated polyolefin binders. For example, in U.S. Pat. No. 3,904,579, a novel flooring composition is disclosed that comprises a plasticized vinyl chloride polymer compounded with a terpolymer comprising vinyl chloride/vinyl $C_2$-$C_4$ alkanoate/$C_2$-$C_4$ alkene and filler. While the composition contains no asbestos, the terpolymer comprises at least 75% to 80% of the composition, such containing vinyl chloride. Chlorinated polyethylene is disclosed to be of use in place of, or along with, poly(vinyl chloride) in this formulation. However, the use of such does little to eliminate the use of vinyl chloride in the compounded composition. Further, chloropolyethylene-containing compositions have been noted as difficult to process on low-intensity equipment and lack clarity and hardness.

Most acrylates have high affinity for absorbing moisture and are poor flooring materials in this respect. They also have high Tg's and, if plasticizer used to adjust, such become mushy.

SUMMARY OF THE INVENTION

It is, therefore, an object of this invention to provide an improved flooring composition that is non-vinyl.

It is a further object of this invention to provide a non-vinyl flooring composition that has good processing properties.

It is an additional object of the present invention to provide a non-vinyl flooring composition substantially free of asbestos and having good melt strength and ease of processing.

It is an additional object of the present invention to provide a non-vinyl, non-fibrous flooring composition possessing the desirable properties of fibrous flooring compositions, such as good tensile strength, low moisture absorption, and high dimensional stability. These and other objects will become apparent to one skilled in the art from the consideration of the specification.

DESCRIPTION OF THE PREFERRED EMBODIMENTS

In accordance with the present invention, a decorative non-vinyl surface covering is formed by the admixture of a mineral filler, such being substantially uniformly distributed throughout a binder that is a blend of a chlorinated polyethylene and a copoly(alkyl acrylate/cycloalkyl acrylate).

The mineral fillers of preference herein are those of a non-fibrous nature such as limestone, whiting, clay, talc, silica, pumice, wood floor, and mixtures thereof. As disclosed earlier, while fibrous fillers are within the scope of the present invention, such do not represent highly desirable fillers. In the preparation of the compositions of the various embodiments herein, filler mixtures of reduced fiber content are preferred. Non-fibrous type filler compositions are particularly useful and limestone represents the most preferred filler, especially limestone comprising very coarse to very fine particle sizes, such having average particle sizes ranging from about 40 to about 340 mesh (Tyler). The amount of filler to be blended with the surface treating composition described below can vary widely and will normally be in the range of from about 60 to about 85 weight percent.

As an essential ingredient, chloropolyethylene forms one component of this mineral-filled surface covering composition.

The chlorinated polyethylene of use in accordance with the present invention is produced from high density polyethylene by a slurry phase chlorination process, as disclosed in U.S. Pat. No. 3,401,129, incorporated herein by reference. The chlorinated polyethylene of particular use herein has a chlorine content of between 35 weight percent and 48 weight percent, preferably 42% to 45% by weight, a crystallinity of 0% to 21%, preferably 0% to 3% as provided by differential thermal analysis, a 100% modulus of at least about 250 to about 500, preferably 350–450, and an ultimate tensile strength of 1000 to 3500 psi. The glass transition temperature (Tg) of −25° C. to +25° C., preferably −15° C. to +10° C., is demonstrated by the chlorinated polyethylenes of use in accordance with the present invention.

As a second ingredient to be used herein, it has been ascertained that when 30 weight percent to 70 weight percent of certain random alkyl acrylate copolymers are blended with the above chlorinated polyethylene, surprising processing, physical and end use properties are imbued to surface covering compositions using these components as binders.

These acrylates, employed in accordance with this embodiment of the present invention, are those random copolymer acrylates having molecular weights ($\overline{M}w$) greater than about 500,000. The upper limit of such molecular weight is not in itself critical, but conventional techniques do not readily produce these copolymers in molecular weights greater than about 2 million. These copolyacrylates have secondary transition temperatures (Tg) in the 45°–85° C. range. The preferred copolymers are the linear or branched $C_1$ to $C_8$ alkyl acrylate/$C_6$ to $C_{12}$ cycloalkylacrylate. Most preferred are the copolymers of linear or branched $C_1$ to $C_4$ alkyl acrylate/cyclohexyl acrylate or isobornyl acrylate and are set in U.S. Pat. No. 2,117,321, incorporated herein by reference.

The above-disclosed copolymeric acrylate and chloropolyethylene are mixed with the mineral filler in the ratios of 8–32:32–8:60 to 3–12:12–3:85, preferably from 26–14:3–12:60 to 9.75–5.25:3–12:85, most preferably 4–16:80. Mixing can be by any conventional technique utilized for blending filler with resinous materials. These techniques include the fusing of the composition in a Baker Perkins mixer and sheeting through hot calender rolls.

In addition to the copolymeric acrylate and chloropolyethylene binder blend in accordance with the present invention, a wide range of organic plasticizers can also be incorporated in these compositions. Illustrative plasticizers include esters of aliphatic glycols and aliphatic dicarboxylic acids such as dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, and the like; esters of aliphatic alcohols and aromatic acids, or aromatic glycols and aliphatic acids, or aromatic alcohols and aromatic acids, including dibutyl phthalate, dicapryl phthalate, dioctyl phthalate, dipropylene glycol dibenzoate, butyl benzyl sebacate, butyl benzyl phthalate, dibenzyl sebacate, dibenzyl phthalate, and the like, are useful herein. Other types of plasticizers such as esters of inorganic acids, including tricresyl phosphate, octyl diphenyl phosphate, and the like, Paraplex G-25 linear polyester or epoxidized soybean oil can also be used. These plasticizers should preferably have low vapor pressure at compounding temperatures, i.e. 400° C. They are employed in plasticizing amounts sufficient to provide mechanical properties which are desirable in the end use applications. Normally, a satisfactory range of plasticizer, including mixtures thereof, is from about 5 weight percent to about 15 weight percent based on the total binder composition.

Small amounts of stabilizers may be incorporated to reduce the effects of degradation of heat and light. Suitable light stabilizers include epoxidized soya bean oil, epoxidized tallates, wood rosin, phosphites, resorcinol disalicylate, resorcinol dibenzoate, phenyl phthalate, phenyl benzoate, ortho-tolyl benzoate, eugenol, and organic phosphates and other complexes of such metals as barium, cadmium, strontium, lead, tin and the like.

Suitable heat stabilizers include barium-cadmium soaps, barium-cadmium-zinc soaps, epoxides, sulfides and sulfites of the metals silver, calcium, cadmium, magnesium, cerium, sodium, strontium and the like. Normally, the novel compositions in accordance with the present invention contain from about 2.5 to 7.5 weight percent of the above heat and light stabilizers based on total amount of binder. If desired, small amounts of antioxidants such as the hindered phenols, e.g. di-t-butyl-p-cresol, and lubricants such as stearic acid, waxes, and so forth, may be incorporated to obtain further improved calendering and compounding characteristics.

For most purposes, the compositions of this invention are prepared with a pigment. Examples of suitable pigments are titanium dioxide, phthalocyanine blue, phthalocyanine green, chrome yellow, chrome orange, red iron oxide, carbon black, lamp black, chrome oxide green, and the like. The proportion of pigment in the composition varies depending on the type of pigment and may be as low as 0.5% by weight and up to about 5.0% by weight total composition. Inert and extender pigments, such as silica aerogels, talcs, and diatomaceous silica, commonly used in organic coatings are suitable for controlling the gloss of the composition, if desired.

The compositions in accordance with the present invention have tensile strength of from 1000 psi to 4000 psi, displaying superior product durability than vinyl counterparts. They also show higher Olsen stiffness (from greater than 2.4 to about 6.0) and advantageously lower moisture absorption than the typical all vinyl chloride systems.

The surface covering compositions of this invention are of particular use in the calendering and molding of floor tiles. Such molding can produce tiles of various shapes and sizes including the usual 9 inch × 9 inch tile. The compositions can be molded into sheets and such used to cover large areas of floor surfaces. It is also within the contemplation of the present invention to use the molded sheets for other applications where non-vinyl compositions of superior tensile strength and elongation are desired, for example, as covering tables, counters and the like.

EXAMPLES

The chloropolyethylene used in the illustrative examples is Cl % by weight 43.1, Tg 0° C., and 100% modulus 432.

The copoly(alkyl acrylate) is shown in these examples as acrylic copolymer and is the copoly(methylmethacrylate/isobornyl acrylate 30/70) of Tg 61° C. and $\overline{M}w$ 800,000. Stabilizer I, dicyandiamide-based, Tenneco V5660; Stabilizer II, melamine-based, Tenneco V1762; asbestos, 7R grade.

In the illustrative examples, the following components were admixed in the ratios noted.

Example 1

|  | % by wt. | (parts binder) |
|---|---|---|
| Chloropolyethylene | 15.36 | (80) |
| Acrylic Copolymer | 3.84 | (20) |
| Stabilizer I | 0.54 | |
| Stabilizer II | 0.26 | |
| Asbestos | 4.92 | |
| Limestone 40M | 74.10 | |
| Titanium Dioxide | 0.98 | |
|  | 100.00 | |

The above are mixed in the Baker Perkins to 290° F. (20 minutes). The material is discharged unto a mill with the rolls set at 220° F./270° F. The slightly rigid sheet is press polished and the physical properties measured (Table I).

Example 2

|  | % by wt. | (parts binder) |
|---|---|---|
| Chloropolyethylene | 13.056 | (80) |
| Acrylic copolymer | 3.264 | (20) |
| Butyl benzyl phthalate | 1.000 | |
| Stabilizer I | 0.450 | |
| Stabilizer II | 0.230 | |
| Asbestos | 5.043 | |
| Limestone 40M | 75.948 | |
| Titanium Dioxide | 1.009 | |

The above are mixed in the Baker Perkins to 290° F. (20 minutes). The material is discharged unto a mill with the rolls set at 220° F./280° F. The flexible sheet is press polished and the physical properties measured (Table I).

Example 3

|  | % by wt. | (parts binder) |
|---|---|---|
| Chloropolyethylene | 8.287 | (50) |
| Acrylic copolymer | 8.288 | (50) |
| Butyl benzyl phthalate | 1.000 | |
| Stabilizer I | 0.280 | |
| Stabilizer II | 0.145 | |
| Asbestos | 5.043 | |
| Limestone 40M | 75.948 | |
| Titanium Dioxide | 1.009 | |

The above are mixed in the Baker Perkins to 320° F. (20 minutes). The material is discharged unto a mill with the rolls set at 220° F./280° F. The rigid sheet is press polished and the physical properties measured (Table I).

Example 4

|  | % by wt. | (parts binder) |
|---|---|---|
| Chloropolyethylene | 12.67 | (80) |
| Acrylic copolymer | 3.17 | (20) |
| Butyl benzyl phthalate | 1.50 | |
| Stabilizer I | 0.44 | |
| Stabilizer II | 0.22 | |
| Asbestos | 5.04 | |
| Limestone 40M | 75.95 | |
| Titanium Dioxide | 1.01 | |

The above are mixed in the Baker Perkins to 290° F. (20 minutes). The material is discharged unto a mill with the rolls set at 200° F./260° F. The flexible sheet is pressed polished and the physical properties measured (Table I).

Example 5

|  | % by wt. | (parts binder) |
|---|---|---|
| Chloropolyethylene | 6.018 | (80) |
| Acrylic copolymer | 1.500 | (20) |
| Coumerone indene resin (Hercules 6100) | 6.835 | |
| Butyl benzyl phthalate | 1.330 | |
| Stabilizer I | 0.211 | |
| Stabilizer II | 0.106 | |
| Asbestos | 5.170 | |
| Limestone 40M | 77.800 | |
| Titanium Dioxide | 1.030 | |

The above are mixed in the Baker Perkins to 280° F. (10 minutes). The material is discharged unto a mill with the rolls set at 180° F./280° F. The flexible sheet is press polished and the physical properties measured (Table I).

Example 6

|  | % by wt. |
|---|---|
| Chloropolyethylene | 6.0 |
| Acrylic copolymer | 1.6 |
| Coumerone indene resin (Hercules 6100) | 6.8 |
| Butyl benzyl phthalate | 1.4 |
| Stabilizer I | 0.2 |
| Stabilizer II | 0.2 |
| Asbestos | 5.2 |
| Limestone 40M | 77.6 |
| Titanium dioxide | 1.0 |

The above was charged to a Baker Perkins mixer and heated to 290° F. (15 minutes). The mix was quite wet at discharge. It was sheeted on the rolls (175° F./270° F.) and calendered to ⅛ inch gauge. Physical properties were then determined (Table I).

Example 7

|  | % by wt. | phr |
|---|---|---|
| Chloropolyethylene (100% modulus=366, Tg = −13° C., Cl = 43.1%) | 13.10 | 80 |
| Acrylic copolymer | 3.30 | 20 |
| Butyl benzyl phthalate | 1.00 | |
| Stabilizer (dicyandiamide type) | 0.40 | |
| Stabilizer (melamine type) | 0.20 | |
| Limestone 325M | 1.25 | |
| Limestone 40M | 79.75 | |
| Titanium dioxide | 1.00 | |

The above materials are mixed on a Baker Perkins mixer for 15 minutes at 310° F. The large particles are discharged unto a mill with rolls set at 200°/260° F. The flexible sheet obtained is press polished and physical properties measured (Table I).

Table I

|  | Typical[1] Vinyl Tile | 1 | 2 | 3 | 4 | 5 | 6 | 7 |
|---|---|---|---|---|---|---|---|---|
| Thickness (mils) | 63 | 71 | 72 | 69 | 74 | 66 | 129 | 72 |
| Specific Gravity | 2.15 | 2.17 | 2.21 | 2.22 | 2.22 | 2.27 | 2.17 | 2.22 |
| Tensile Strength (psi) | 899 | 2284 | 1633 | 3345 | 1092 | 1820 | 1277 | 1485 |
| Elongation (%) | 2.1 | 1.5 | 5.1 | 0.7 | 6.0 | 0.6 | 2.2 | 5.1 |
| Olsen Stiffness (in.-lbs.) | 1.9 | 4.8 | 3.3 | 5.1 | 2.5 | 3.6 | — | 4.3 |
| Bend Break Angle (degrees) | 27 | 15 | 37 | 6 | 42 | 7 | — | 40 |
| Moisture Absorption (% W) | 2.31 | 0.81 | 0.97 | 0.83 | 1.20 | 0.72 | 1.03 | 1.12 |
| Dimensional Stability (% L) | −0.12 | −0.04 | −0.01 | −0.02 | −0.18 | −0.08 | — | −.19 |

[1]Vinyl chloride/vinyl acetate copolymer $\bar{M}w$ 41,600, 11% by weight blended with coumerone indene resin 2% by weight, phthalate plasticizer 4.8% by weight, Stabilizer I and Stabilizer II (1:1) 0.89% by weight, asbestos 4.99% by weight, limestone 40M, 75.12% by weight and titanium dioxide 1.00% by weight.

What is claimed is:

1. A non-vinyl surface covering composition comprising
   a. a mineral filler distributed substantially uniformly throughout
   b. a binder comprising the components
      1. chloropolyethylene of chlorine content 35% to 48% by weight, a 100% modulus of 250 to about 500 and a glass transition temperature of from −25° C. to 30° C.; and
      2. a copoly(C$_1$ to C$_8$ alkyl acrylate/C$_6$ to C$_{12}$ cycloalkyl acrylate) of molecular weight from about 500,000 to about 2 million where the ratio of component (1):component (2):mineral filler is from 8–32:32–8:60 to 3–12:12–3:85.

2. The composition of claim 1 wherein said component (2) is copoly(C$_1$ to C$_4$ alkyl acrylate/cyclohexyl acrylate or isobornyl acrylate).

3. The composition of claim 1 wherein said ratio is from 26–14:3–12:60 to 9.75–5.25:3–12:85.

4. A non-vinyl surface covering composition comprising
   a. 60% to 85% by weight of a non-fibrous filler,
   b. 40% to 15% by weight of a binder comprising the components
      1. 30% to 70% by weight based on total binder of chloropolyethylene of chlorine content 35% to 48% by weight, a 100% modulus of 250 to about 500 and a glass transition temperature of from −25° C. to 30° C.; and
      2. 70% to 30% by weight based on total binder of a copoly(C$_1$ to C$_8$ alkyl acrylate/C$_6$ to C$_{12}$ cycloalkyl acrylate) of molecular weight from about 500,000 to about 2 million.

5. The surface covering composition of claim 4 wherein said non-fibrous filler is calcium carbonate, and said component (2) is copoly(C$_1$ to C$_4$ alkyl acrylate/cyclohexyl acrylate or isobornyl acrylate).

6. The surface covering composition of claim 4 additionally containing 5–15% by weight of an organic plastizicer.

7. The surface covering composition of claim 5 wherein said calcium carbonate is of average particle size from about 325 mesh to about 40 mesh (Tyler).

8. Molded floor tiles from the composition defined in claim 4 having a tensile strength greater than 1000 psi to 4000 psi.

9. The molded floor tiles of claim 4 additionally containing asbestos and said component (2) is 20 to 65 weight percent of said binder.

* * * * *